Jan. 8, 1957  J. C. SMITH  2,776,465
HIGHLY ORIENTED SHAPED TETRAFLUOROETHYLENE ARTICLE
AND PROCESS FOR PRODUCING THE SAME
Filed Aug. 12, 1954  3 Sheets-Sheet 1

INVENTOR
JACK C. SMITH
BY
ATTORNEY

Jan. 8, 1957  J. C. SMITH  2,776,465
HIGHLY ORIENTED SHAPED TETRAFLUOROETHYLENE ARTICLE
AND PROCESS FOR PRODUCING THE SAME
Filed Aug. 12, 1954  3 Sheets-Sheet 3

*INVENTOR*
JACK C. SMITH

BY Robert J. Reichert
*ATTORNEY*

United States Patent Office 2,776,465
Patented Jan. 8, 1957

2,776,465

**HIGHLY ORIENTED SHAPED TETRAFLUORO-
ETHYLENE ARTICLE AND PROCESS FOR
PRODUCING THE SAME**

Jack C. Smith, Silver Spring, Md., assignor to E. I. du Pont de Nemours and Company, Wilmington, Del., a corporation of Delaware Application August 12, 1954, Serial No. 449,348

22 Claims. (Cl. 28—82)

This invention relates to the preparation of shaped articles with improved properties from tetrafluoroethylene polymers. More specifically, it relates to highly drawn and oriented shaped articles such as filaments, fibers, films, foils, tapes, rods, tubes and similar structures.

Some of the outstanding attributes of tetrafluoroethylene polymers are excellent resistance to chemicals and to heat degradation and extremely low surface friction. These suggest such applications as filter cloths, protective clothing, gaskets and packings. For many applications, the polymer can be utilized most readily in the form of thin films or relatively fine filaments. Until recently, fabrication of these items has been difficult, but new processes have brought a marked advance in the ability to prepare such articles. However, the utilization of tetrafluoroethylene polymers in many applications has been restricted because articles produced heretofore had rather poor mechanical properties, particularly at high temperatures. The shaped articles prepared from tetrafluoroethylene polymers by prior art processes had generally only moderate tensile properties. Further, the low tensile strengths decreased rapidly with increasing temperature despite the fact that the polymer is chemically stable indefinitely at high temperatures (e. g., up to 300° C.).

Accordingly, it is an object of this invention to provide a process for the production of shaped articles having outstanding properties and a further object of this invention is the provision of shaped articles which have outstanding properties at high temperatures. A still further object is the provision of shaped articles such as films, filaments and tapes made from tetrafluoroethylene polymers, which articles have properties far surpassing corresponding properties of heretofore known similar articles.

These objects are accomplished by heating a shaped article made from a tetrafluoroethylene polymer to a temperature above its crystalline melting point and generally below the temperature range in which thermal decomposition becomes appreciable, and drawing the shaped article while it is at the said temperature. While the extent of drawing depends on the temperature and the polymer, generally the shaped article is drawn two or more times its original length. To develop optimum properties, a drawing of at least 7X is generally applied; the hot drawing process of this invention provides for greater draw ratios than heretofore available. For example, filaments have been drawn in accordance with this process as high as 35X without difficulty. The process of this invention thus comprises increasing the draw ratio by heating the article above the crystalline melting point of the polymer constituting the article and drawing the article while it is at the desired temperature at least two times the original length of the article, the temperatures and exposure times being, of course, adjusted to avoid substantial decomposition of the polymer. The crystalline melting point of tetrafluoroethylene homopolymer at atmospheric pressure is approximately 325° C. The precise value is subject to some uncertainty, but there seems to be general agreement among those in the polymeric field that it is in the range of 320° to 327° C. at atmospheric pressure. Weight loss of polytetrafluoroethylene amounts to only 0.003% after one hour at 360° C., but after one hour at 430° to 450° C., the loss is 1.5%. Therefore, the temperature used is preferably below this, and usually the temperature does not exceed 400° C. However, using short contact times, such high temperatures can be used, but there is no particular advantage in their use. As indicated above, the time of exposure may be quite long, if desired. Generally, the process is done on a continuous basis, the times involved in the heating and drawing steps are very short, and the steps are usually done simultaneously.

The invention may be more clearly understood by referring to the following examples. In the examples, which are given for illustrative purposes only and are not limitative, the parts are by weight and all processes were carried out at room temperature (about 25° C.) unless otherwise stated.

Relative to the discussion below, orientation angles are measured on X-ray patterns of fibers or films and reflect the alignment of the crystallites with respect to the fiber axis or direction of draw. The angle is conveniently used as a measure of this alignment. Orientation angle measurements shown the hot drawn structures of this invention to be extremely highly oriented. It has been found by this invention that orirentation is always greater for hot drawn samples than for samples drawn an aquivalent amount at temperatures below the crystalline melting point. The rate of increase of orientation with temperature of drawing shows a break to a larger value at the crystalline melting point.

The terms "order" or "crystallinity" refer to the perfection and regularity of the arrangement of molecules with respect to each other in the polymer. In drawn fibers, a further distinction can be made when the crystallites are oriented (aligned along the fiber axis). This distinction separates the order parameter into one for each direction: across the fiber (lateral order) and along the fiber axis (longitudinal order). A marked change is observed in the ratio of these kinds of order for hot drawn yarns. This ratio of lateral order to longitudinal order represents a new type of measurement of relative crystallinity. A flying spot microphotometer was used to measure the relative amounts of crystalline diffraction and amorphous scattering in the patterns. The peak intensities of three areas on the film were recorded. These were: (1) the equatorial (110) diffraction representing the lateral or chain-to-chain order, (2) the layer-line (106) diffraction representing the longitudinal order in the direction of the fiber axis and (3) the unoriented amorphous halo. These ratios represent a semi-quantitative measure of the amount of crystallinity in fibers. They cannot be used to measure exactly the crystalline content of the fibers because only a sample of the total crystalline or amorphous diffraction is obtained by this technique. The total integrated scattering as well as a separation of crystalline and amorphous contributions is necessary before exact percentages can be quoted.

On a relative basis, however, the following comparisons are valid: (1) A definite increase in crystallinity is achieved at draw temperatures above 325° C. The rate of change of crystallinity with increasing draw temperature rises sharply in the vicinity of the crystalline melting point (2). The above effect is more pronounced for the direction along the fiber axis. This means that new and additional order is introduced in this direction by hot drawing. The effect does not signify a greater relative increase in crystallite size.

Modulus is the ratio of change in unit stress to change in unit strain. Initial modulus is the stress at zero strain and is measured by the slope of the stress-strain curve beginning at zero extension.

In the figures:

Figure 1 presents graphically the relationship between maximum draw ratio and temperature;

Figure 2 gives the physical properties of yarns drawn 7× at various temperatures, the dotted curve being the elongation curve;

Figure 3 plots physical properties against temperature, the yarns being drawn to an extent equal to the maximum draw ratio at the temperature less 2× and the dotted line being the elongation curve;

Example I

Figures 1, 2:
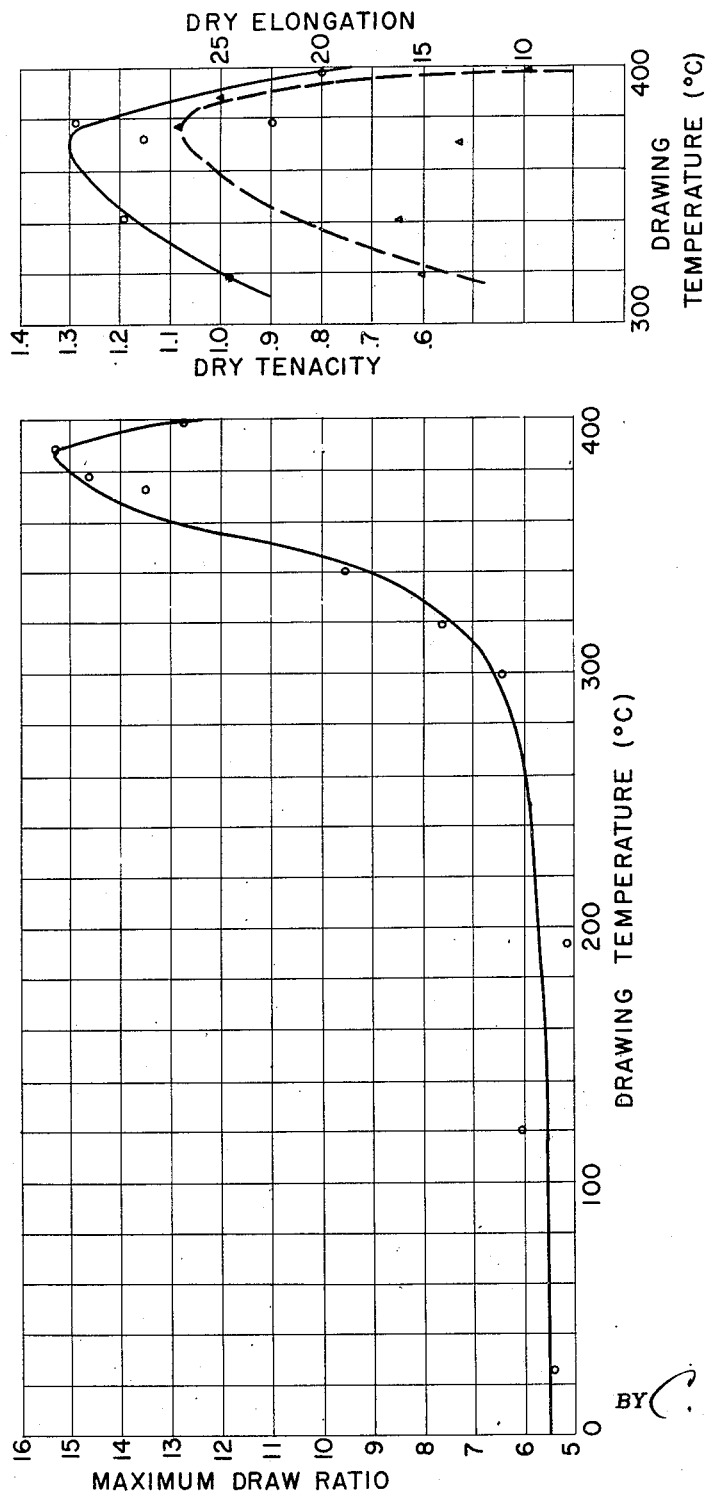

Dry, granular polytetrafluoroethylene powder was extruded at a pressure of 143,000 p. s. i. at a temperature of 256° C. through a 0.005 inch orifice at 0.26 yard per minute to produce a 0.0048 inch diameter filament. This was sintered for ten minutes at 400° C. and then drawn 4× at room temperature. The filament had an orientation angle of 27°. The high orientation angle is evidence of poor orientation and low strength attained in this prior art process. Its X-ray diffraction pattern is similar to that shown in Figure 5. Orientation angles are measured on one diffraction spot, the second equatorial spot, and are formed by drawing a line from each end of the arc or spot to the center of the pattern.

Example II

A cetane-lubricated tetrafluoroethylene polymer composition was extruded from a 0.005 inch orifice at a pressure of approximately 45,000 p. s. i. and a temperature of approximately 52° C. The cetane was evaporated from the extruded filament at a temperature of 300° C. and the filament was then heated at 400° C. for ten minutes to sinter the polymer. The filament was cold drawn 4× at room temperature to yield a 65 denier monofil with a tenacity of 0.5 gram per denier and an orientation angle of 37°. Here again, evidence is given demonstrating that filaments of the prior art are unsatisfactory in strength and degree of orientation.

The hydrocarbon-lubricated tetrafluoroethylene polymer compositions used for extruding these filaments are described in U. S. Patent No. 2,586,357.

Example III

A cetane-lubricated tetrafluoroethylene polymer composition similar to that of Example II was extruded at a pressure of 50,000 to 60,000 p. s. i. and a temperature of 85° C. The cetane was volatilized at 300° C. and the filament was heated for ten minutes at 400° C. to sinter the polymer. It was then drawn 4× at room temperature. The resulting filament had unsatisfactory orientation as evidenced by its orientation angle of 47°.

Example IV

A cetane-lubricated tetrafluoroethylene polymer composition similar to that of Example III was extruded at 18,400 p. s. i. at 25° C. The cetane was evaporated at 300° C. and the filament was sintered at 420° C. The filament, after being drawn 4× at room temperature, had an orientation angle of 51°.

Example V

A composition similar to that of Example IV was extruded at 29,600 p. s. i. at room temperature through a spinneret 0.2905 inch long and 0.007 inch in diameter. The 800 denier as-spun filament was heated at 300° C. to remove cetane and was then sintered at a temperature of approximately 400° C. After cooling to room temperature, the filament was drawn 3.5× at room temperature to give the following properties: tenacity=0.42 gram per denier elongation=23%, initial modulus=4.5 grams per denier, and denier=190.

The average properties of a number of filaments prepared by such prior art processes as described in Examples I to V are as follows: denier=100 to 900, tenacity =0.4 to 0.6 gram per denier, elongation=30% to 40%, initial modulus=3.0 to 5.0 grams per denier.

Example VI

A lubricated tetrafluoroethylene polymer composition which contained approximately 80% polytetrafluoroethylene and 20% of a mineral oil was extruded at a pressure of 37,000 p. s. i. through a spinneret 0.375 inch long and 0.006 inch in diameter. The oil was removed at approximately 300° C., and the polymer was sintered by heating the filament at 400° C. for ten minutes. After drawing 8.4× at 360° C., the resulting filament had the following properties at room temperature: tenacity=1.9 gram per denier, elongation=14%, initial modulus=17 grams per denier, orientation angle=7°. As can be seen, this new filament has about 5 times the strength of prior art products.

Example VII

A lubricated tetrafluoroethylene polymer composition containing approximately 82% polytetrafluoroethylene and 18% of a mineral oil was extruded at 27,000 p. s. i. through a spinneret 0.3 inch long and 0.0075 inch in diameter. The oil was flashed off at 300° C. and the polymer sintered by heating the filament at approximately 400° C. for ten minutes. This was then drawn 17.5× at 335° C. to give a filament with the following properties at room temperature: tenacity=2.2 grams per denier, elongation=7.1%, initial modulus=39 grams per denier, and orientation angle=5°.

Example VIII

A lubricated tetrafluoroethylene polymer composition comprising approximately 80% polytetrafluoroethylene and 20% of a kerosene solution containing 2% polyisobutylene was extruded at 30,000 p. s. i. through a spinneret 0.5 inch long and 0.007 inch in diameter to give a 430 denier filament. Kerosene was removed at 300° C. and the polymer sintered at 400° C. The resulting filament was drawn 9.5× at 340° C. The following properties were measured at room temperature: tenacity=2.0 grams per denier, elongation=16%, initial modulus=19 grams per denier.

Example IX

The composition of Example VIII was extruded under the same conditions. Kerosene was removed at 300° C. and the polymer sintered at 400° C. The resulting filament was drawn 25× at 340° C. to give the following properties at room temperature: tenacity=2.4 grams per denier, elongation=4.1%, initial modulus=75 grams per denier, and orientation angle=5°.

Example X

Two (2) volumes of an aqueous dispersion of polytetrafluoroethylene containing 35% solids were mixed with one volume of a 2% solution of sodium alginate to give a modified dispersion containing approximately 25.0% polytetrafluoroethylene, 0.6% sodium alginate, and 74.4% water. These modified dispersions were extruded through a standard viscose type spinneret into a coagulating bath containing a 2% aqueous solution of calcium chloride. The filaments formed were lifted from the bath over a feed roll and then passed around a sintering roll heated at 380° C. This contact with the roll dried the filament and coalesced the polymer. The filament then passed to a wind-up bobbin. The bobbin may be used simply as a collecting device, and the filaments can be subsequently hot drawn. The bobbin can also be operated to hot draw the filament on the sintering roll before it is collected.

The results of several experiments in which filaments were prepared in this manner are given in the table below:

TABLE I

| Hot Drawn Treatment | Denier | Tenacity (g. p. d.) | Elongation (percent) | Modulus (g. p. d.) |
| --- | --- | --- | --- | --- |
| 5X | 18 | 1.4 | 15 | 12 |
| 8X | 26 | 1.4 | 14 | 11.4 |
| 12X | 6 | 1.5 | 12 | 18 |

*Example XI*

A modified dispersion was prepared by mixing five pounds of an aqueous dispersion containing 60% polytetrafluoroethylene and 6% "Triton X-100," a non-ionic dispersing agent, with three pounds 6.5 ounces of a viscose solution containing 7% cellulose, 6% caustic and having a salt index of 6. This modified dispersion was extruded through standard viscose equipment modified by the introduction of a sand pack filter in the stream prior to passage through a shaped orifice. The orifice comprised a slot 3/8 inch wide and 3 mils high in a half inch 25%–75% platinum-gold alloy blank. The modified dispersion was extruded into a standard viscose regenerating and coagulating bath. The film strip was wound up wet on a bobbin and washed 5 to 10 minutes in water at 18° C. The film strip or tape was sintered at 400° C. by passing over a cartridge heater. Samples of the same film could be drawn a maximum of 5X at 365° C. to give a product with a tenacity of 21,670 p. s. i. and an elongation of 34%.

In the examples the term "hot drawing" refers to drawing under conditions such that the filaments are at temperatures above the crystalline melting point of the polymer. This is different from the hot stretching processes referred to frequently in the prior art which are actually cold drawing processes. Cold drawing is drawing at temperatures above room temperature but below the melting point of crystalline polymers. This is the definition used and accepted in the art as evidenced by U. S. Patent No. 2,531,408 which states in column 1, lines 23–27, the following: "Cold drawing may be defined as the stretching of a polymeric material at a temperature below the melting point of the material to give a molecularly oriented structure."

As with filaments, films could be much more highly oriented through the process of this invention. For example, employing films made using dispersions or made by casting, draw ratios above 5.0 could be obtained, leading to films having tensile strengths of 22,000 to 23,500 pounds per square inch and elongations of 22% to 34% whereas when cold drawing procedures were applied to the same films, the strengths were only 11,000 to 13,800 pounds per square inch and the elongations were high, having been 49% to 59%. The best draw ratios obtainable were about 3.0.

The following table compares the properties of hot drawn polytetrafluoroethylene filaments with the properties of comparable filaments drawn at various temperatures below the crystalline melting point:

TABLE II

*Examples*

| | XII | XIII | XIV | XV | XVI |
| --- | --- | --- | --- | --- | --- |
| Drawing Temp. (° C.) | 25 | 100 | 200 | 337 | 360 |
| Draw Ratio (max.) | 3.5 | 3.6 | 3.3 | 7.0 | 10.3 |
| Tenacity (g. p. d.): | | | | | |
| at 70° F. and 65% RH | 0.4–0.6 | 1.0 | 1.0 | 1.4 | 1.9 |
| at 250° C. in oil | 0.2 | | 0.20 | 0.36 | 0.41 |
| Elongation (Percent): | | | | | |
| at 70° F. and 65% RH | 30–40 | 86 | 82 | 11 | 9.5 |
| at 250° C. in oil | 90 | | 78 | 21 | 15 |
| Initial Modulus (g. p. d.): | | | | | |
| at 70° F. and 65% RH | 3.0–5.0 | 3.5 | 4.3 | 16 | 25 |
| at 250° C. in oil | 0.2 | | 0.17 | 0.97 | 1.7 |
| Shrinkage at 250° C. (in air) (Percent) | 30 | | 28 | 8 | 3 |
| Orientation Angle (degrees) | 30–50 | 21 | 17 | 11 | |
| Ratio of Peak Intensities: | | | | | |
| Lateral | 0.6 | 0.4 | 0.4 | 0.94 | |
| Longitudinal | 1.4 | 0.98 | 0.84 | 2.14 | |

In the above table, Example XII represents composite results for filaments prepared from dispersions and also from lubricated pastes. It will be noted that the tenacities, initial modulus and orientation are low and the elongation and shrinkage values are high. Examples XIII and XIV show the results obtained when filaments prepared from dispersions are cold drawn at elevated temperatures which are below the crystalline melting point of the polymer. While tenacity has been improved, the initial modulus and orientations are low and shrinkages are high. However, when the drawing is accomplished in accordance with this invention, as shown by Examples XV and XVI, the tenacities, initial modulus and orientation are high and the elongation and shrinkage are advantageously low. Loop tenacities and loop elongations are also similarly improved. The maximum draw ratio rises sharply at or above the crystalline melting point and optimum properties are obtained.

The data in Table II show the improvement in tenacity obtained by drawing at temperatures above the crystalline melting point. The improvement is particularly noticeable at high temperatures, as evidenced by tenacities measured with the filaments immersed in oil heated to 250° C. Drawing at temperatures above the crystalline melting point produces a marked increase in initial modulus. When the tensile properties are measured at room temperature, the modulus of filaments of this invention is two to three times the value obtained on filaments drawn at temperatures below the crystalline melting point. Again, the high temperature stability is noted, three- to five-fold increases being observed when the modulus measurements are made at 250° C. in oil.

Further, the shrinkage at 250° C. in air is considerably less for filaments of this invention drawn at temperatures above the crystalline melting point. This is not just a heat setting effect, since the shrinkage of filaments drawn at 300° C. is approximately twice that of filaments drawn at 337° C. although both temperatures are appreciably above the 250° C. temperature at which shrinkage measurements were made.

*Example XVII*

Figure 3:
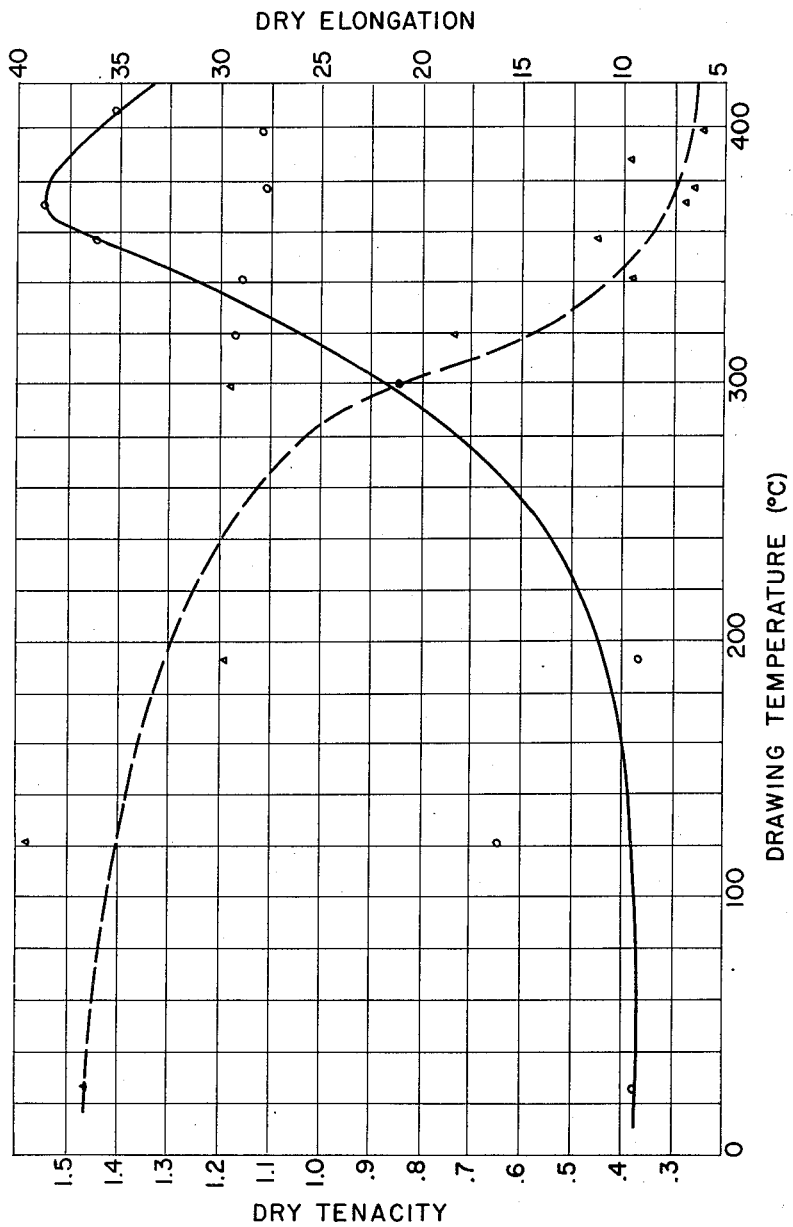

As can be seen from Figures 1 to 3, there is a rapid rise in property levels when the drawing is done at temperatures above the crystalline melting point of the polymer. While some improvement appears in the neighborhood of 250° C., the commercially acceptable property levels cannot be obtained at temperatures below about 310° C. Thus, the temperatures used in the process of this invention are above 300° C. and since the best results are attained using temperatures above the crystalline melting point, such temperatures are usually used and are preferred.

In obtaining the data in Table III below, the yarn was spun under normal conditions using a normal spin mix. It was sintered for 15 second at 390° C. and was collected in a container. It was then reheated to the stated drawing temperature and drawn at the given draw ratios. Maximum draw ratios were determined and are plotted in Figure 1. Properties of yarns drawn 7× were determined and are plotted in Figure 2. Samples were drawn at 2× less than the maximum and these are plotted in Figure 3.

*Table III*

*Physical properties of yarn at various drawing temperatures*

| Drawing Temp., °C. | Maximum Draw Ratio | Maximum Draw Ratio—2× | Physical Properties—Drawn 7× | | | | Physical Properties—Drawn Maximum Less 2× | | | |
|---|---|---|---|---|---|---|---|---|---|---|
| | | | Tenacity (Dry), g. p. d. | Tenacity (Loop), g. p. d. | Elongation (Dry), Percent | Elongation (Loop), Percent | Tenacity (Dry), g. p. d. | Tenacity (Loop), g. p. d. | Elongation (Dry), Percent | Elongation (Loop), Percent |
| 25 | 5.4 | 3.4 | Could not be drawn 7× | | | | 0.38 | 0.40 | 36.7 | 40.0 |
| 121 | 6.1 | 4.1 | do | | | | 0.68 | 0.63 | 39.6 | 40.0 |
| 193 | 5.2 | 3.2 | do | | | | 0.37 | 0.39 | 28.8 | 37.1 |
| 299 | 6.4 | 4.4 | do | | | | 0.85 | 0.81 | 28.6 | 28.6 |
| 319 | 7.6 | 5.6 | 0.98 | 0.96 | 15.2 | 10.8 | 1.17 | 1.12 | 18.5 | 26.4 |
| 341 | 9.5 | 7.5 | 1.19 | 1.33 | 16.1 | 14.9 | 1.16 | 0.98 | 9.6 | 10.1 |
| 371 | 13.5 | 11.5 | 1.16 | 1.18 | 13.2 | 15.8 | 1.55 | 1.39 | 6.9 | 6.7 |
| 377 | 14.7 | 12.7 | 1.29 | 1.04 | 27.1 | 15.7 | 1.11 | 1.17 | 6.7 | 5.5 |
| 388 | 15.3 | 13.3 | 1.00 | 0.87 | 25.0 | 18.0 | 1.41 | 1.32 | 9.6 | 6.2 |
| 399 | 12.8 | 10.8 | 0.80 | 0.85 | 9.8 | 13.5 | 1.12 | 1.19 | 6.1 | 7.6 |

*Example XVIII*

A polytetrafluoroethylene polymer filament was drawn 29× at 400° C. to give a 2.4 denier yarn having the following properties: tenacity=1.2 grams per denier; elongation=2.4%, modulus=71 grams per denier.

It will be noted that in Example XVII the sintering and drawing steps were conducted separately. Since maximum draw ratios are higher in the simultaneous process, the latter is preferred. The heating and drawing steps may be conducted separately or simultaneously. Normally, the steps are carried out at the same time. Further, the process of this invention may be applied to undrawn or to cold drawn articles of the tetrafluoroethylene polymers.

Figure 4:
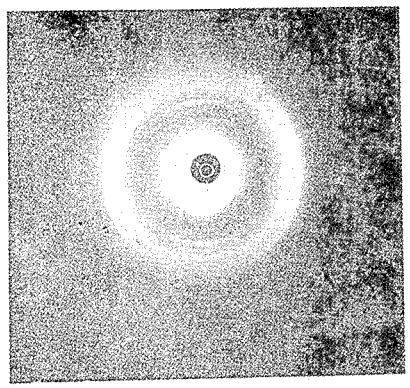
Figure 4 is an X-ray diagram of an undrawn filament.
Figure 6:
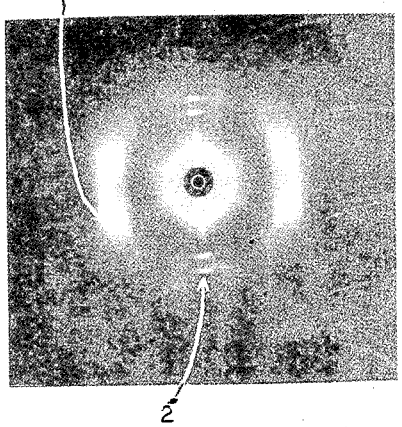
Figure 6 is an X-ray diffraction pattern of a filament in accordance with this invention drawn at 337° C.
Figure 5:
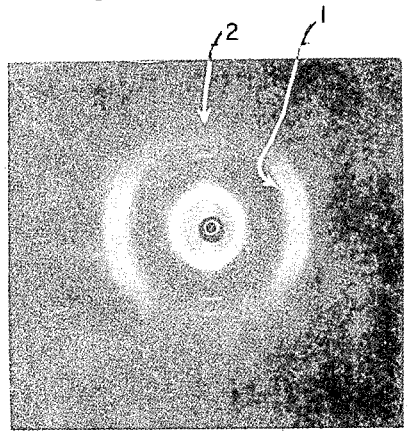
Figure 5 is an X-ray diffraction pattern of a cold drawn filament.

Figure 4 shows the X-ray diffraction pattern for an undrawn polytetrafluoroethylene fiber; Figure 5 shows the pattern for a similar fiber drawn 3× at room temperature; and Figure 6 shows the pattern of a similar fiber drawn 7× at 337° C. The marked improvement in orientation obtained by this invention is shown by comparing these patterns. The crystalline spots are much more intense for the oriented structure of this invention, whereas such crystalline spots are barely perceptible or are almost absent in the fiber drawn at room temperature or in the undrawn structure. As shown in the figures, wherein reference numbers 1 are for longitudinal orientation and 2 are for lateral orientation, the crystalline pattern in the unoriented or cold-drawn structures are very diffuse and in the form of arcs rather than spots. In another comparison, the orientation angle in Figure 4 is 40°; that in Figure 5 is 27°; but that in Figure 6 is only 11°.

Figure 7:
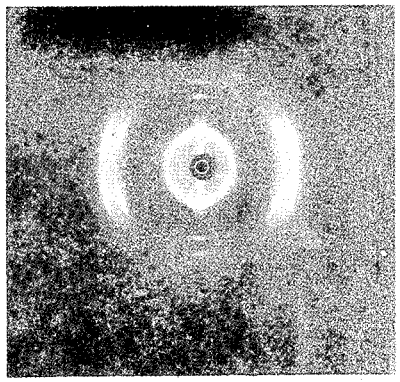
Figure 7 is an X-ray diffraction pattern of a polytetrafluoroethylene fiber similar to that used in Figure 6 but drawn at 300° C.

In Figures 6 and 7 a comparison is given between a polytetrafluoroethylene fiber drawn as much as possible at 300° C. (4×) and a similar fiber drawn at 337° C. using the minimum draw ratio required to produce optimum properties (7×). As can be seen, the unoriented ring, the central ring, in the 300° C. result is much more intense showing that there is more amorphous material present. Further, the crystalline spots in the 337° C. result are much more intense showing greater crystallinity. The arcs of the crystalline spots are much shorter, the orientation angles being smaller for the 337° C. result. The orientation angle for the 300° C. result is about 15° whereas that in the 337° C. result is 11°, showing greater orientation. If the extent of drawing is increased at 337° C., the orientation angle becomes even less; for example, drawing the filament about 17× resulted in orientation angles of about 5°. Below about 300° C. it is not possible to draw more than about 4× and while such draw ratios can be attained around 300° C. and below the polymer's crystalline melting point with resultant orientation and improved properties it is preferred to use temperatures at or above the polymer's crystalline melting point.

Tetrafluoroethylene polymers are not appreciably soluble in any liquids except certain highly fluorinated organic compounds. Even these fluorinated compounds will not form solutions containing more than about 5% by weight of polytetrafluoroethylene. Accordingly, the preparation of shaped articles, such as filaments and films, by the usual wet and dry spinning methods is not practical. Polytetrafluoroethylene can be melted without appreciable decomposition, but the temperatures required to reduce the melt viscosity to a level suitable for melt spinning are too high for melt spinning to be practical and the viscosity is too high at temperatures at which the melt is stable.

However, a number of methods have been and are being developed for the preparation of filaments and films and similar extruded objects from tetrafluoroethylene polymers. U. S. Patents Nos. 2,559,750, 2,586,357, 2,630,417 and 2,644,802 are recent patents which describe some of these methods. The lubricated paste method described, for example, in U. S. Patent No. 2,586,357 is a more practical method than many of the earlier methods suggested. In preparing filaments by this method, it has been found that smoother extrusion is obtained by the use of spinnerets which are relatively long in comparison with their diameter. Length to diameter ratios of 40:1 or greater are preferred. Weak spots due to irregular extrusion are observed when spinnerets with very low length to diameter ratios are used.

Examples are also given which describe the preparation of filaments by extruding dispersions of the polymer in aqueous solutions containing a water soluble matrix-forming material. Some difficulties have been experienced with filament fusion during the sintering step when attempts were made to spin multifilaments of polytetrafluoroethylene by this technique. It has been found that these difficulties can be overcome by passing the gel filaments obtained prior to sintering through an aqueous dispersion of an inert substance, such as zinc oxide, calcium carbonate or titanium dioxide. The individual filaments of the multifilament thus become coated with fine particles of these substances and this coating prevents fusion during the sintering operation. The uses of sizes of this type is generally not required when using viscose as a matrix.

Advantage can be taken of this tendency for filaments to fuse to produce large monofilaments from multifilaments. It is difficult to spin a large denier monofil by extruding these modified dispersions through a single hole because of the small surface area presented to the coagulating bath in comparison to the volume of dispersion extruded. Furthermore, the large holes required in large denier monofil spinnerets present special process difficulties, such as drips and back-flow of the coagulating bath. However, if a large number of filaments are spun from a multifil spinneret with holes of conventional size and coagulated, a monofil of denier approximately equal to the total multifil denier can be made by fusing the bundle together during the sintering process.

Another method is available for preparing fine denier polytetrafluoroethylene filaments which has not been described previously. This comprises coating fine denier viscose rayon filaments or similar filaments with an emulsion of polytetrafluoroethylene particles, subjecting the coated filaments to a temperature between 330° and 400° C. to fuse the polymer particles together and decompose the viscose filament, and then cooling. The filament can be drawn as desired.

This invention is concerned primarily with tetrafluoroethylene homopolymer. Copolymers of tetrafluoroethylene and other unsaturated compounds (e. g., ethylene, chlorotrifluoroethylene, and perfluoropropylene) can be used. Usually, the amount of copolymerizable monomer or monomers is limited to no more than a few percent. Tetrafluoroethylene polymers in which the end groups of the polymer chain are supplied by non-polymerizable compounds (e. g., methanol and ethanol) may also be used, but the properties of these telomers are generally somewhat inferior to those of the non-telomerized polymers.

In addition to polymer, the shaped articles of this invention can contain other materials such as dispersing agents, plasticizers, pigments, salts, dyes, clay, silica and similar materials. These materials may be added to the spinning compositions (e. g., lubricated pastes or dispersions), or they may be incorporated later in the process, as by addition to the coagulating bath when the shaped article is prepared by extruding modified dispersions of the polymer. Tetrafluoroethylene fibers have been prepared by this latter process which contain up to 20% of a filler such as titanium dioxide, chromium oxide, or talc. These fibers can be drawn satisfactorily, but usually have lower tenacities and elongations than the fibers prepared from the pure homopolymer under comparable conditions.

The products described here are markedly different from those described in the prior art. The mechanical properties have been altered sufficiently so that the filaments and the films can be considered suitable for use in practically any application. This overcomes the deficiencies of the prior art products at elevated temperatures which prevented them from being utilized in many applications for which their excellent resistance to corrosion and solvent action and good thermal stability ideally suited them.

The advance was achieved by drawing the shaped articles at temperatures above the crystalline melting point of the polymers. Any suitable processes may be used for preparing the shaped articles. The drawing may be done at any temperature between the crystalline melting point and the decomposition point of the polymer. Polymer temperatures of approximately 430° C. represent a practical upper operating limit since polymer degradation begins to become appreciable at this temperature. Where sintering and drawing are combined into a single continuous operation, temperatures of approximately 400° C. represent about the best balance between sintering rate, drawability, decomposition and good yarn properties. Where drawing is performed as a separate operation, it is preferably carried out at temperatures between 330° C. and 400° C. Under these conditions, optimum properties have been obtained by drawing at temperatures between 350° and 370° C. In all cases, the temperatures referred to are the approximate temperatures of the polymer in the shaped structure. The values were determined by passing filaments through a molten salt bath for a sufficient length of time to bring them approximately to equilibrium temperatures.

When hot plates, pins or rolls are used, the surface temperatures of these objects can be appreciably higher than the optimum values reported here since long contact times are required to bring the temperature of the polymer up to the temperature of the heated object. For example, contact times of 13 seconds were required for a bundle of 30 filaments having a total denier of 175 to approach the temperature of a plate heated to approximately 400° C. The calculated time required to reach equilibrium in a molten salt bath is of the order of one second.

Development of optimum mechanical properties is dependent also upon the sintering conditions. Incomplete sintering results in weak spots with attendant poor mechanical properties. The minimum temperature for sintering to develop maximum physical properties appears to be approximately 400° C. At this temperature, yarns have to be sintered at least about seven seconds before maximum physical properties can be developed. Higher sintering temperatures naturally require shorter sintering times and sintering temperatures up to 430° C. have been used successfully. At temperatures below about 375° C., the contact times required to develop maximum properties become excessive. Once again, reference is made to actual polymer temperatures and the temperature of the heating media may be higher if contact times are short. Any suitable heating media, such as molten salt or metal baths, heated rolls or plates, hot air, or radiant heat may be used. The use of two canted rolls with the filaments wound in a figure-8 pattern has been found to be practical and effective.

Any departure from the above description which conforms to the present invention is intended to be included within the scope of the claims.

I claim:

1. A process for the formation of a highly oriented shaped article of a tetrafluoroethylene polymer which comprises heating a shaped article of said polymer to a temperature above the crystalline melting point of said polymer and drawing the said shaped article while it is at the said temperature at least 2 times its original length to produce said highly oriented shaped article of said polymer.

2. A process in accordance with claim 1 wherein said polymer is polytetrafluoroethylene.

3. A process for the production of a highly oriented shaped article of a tetrafluoroethylene polymer which comprises heating a shaped article of said polymer to a temperature between about 300° C. to about 400° C. and drawing the said shaped article while it is at said temperature at least 2 times its original length to produce said highly oriented shaped article of said polymer.

4. A process in accordance with claim 3 wherein said temperature is above the crystalline melting point of said polymer.

5. A process in accordance with claim 3 wherein said drawing is at least 4 times the original length of the said article.

6. A process in accordance with claim 3 wherein said heating and said drawing steps are preformed simultaneously.

7. A process for the formation of a highly oriented shaped article of a tetrafluoroethylene polymer which comprises heating a shaped article of said polymer to a temperature above the crystalline melting point of said polymer and drawing the said shaped article at least 4 times its original length to produce said highly oriented shaped article of said polymer.

8. A highly oriented shaped article of a tetrafluoroethylene polymer having a tenacity above about 1.0 gram per denier when measured at room temperature.

9. An article in accordance with claim 8 having an orientation angle below about 13°.

10. An article in accordance with claim 8 having an initial modulus, when measured at room temperature above about 5 grams per denier.

11. An article in accordance with claim 8 having a tenacity, when measured at 250° C. above about 0.3 gram per denier.

12. A highly oriented shaped article of a tetrafluoroethylene polymer comprising a hot drawn shaped article of said polymer having, after being hot drawn, a tenacity above about 1.0 gram per denier when measured at room temperature.

13. An article in accordance with claim 12 having an orientation angle below about 13°.

14. A highly oriented shaped article of a tetrafluoroethylene polymer comprising a shaped article of said polymer having been drawn at a temperature between about 300° C. and about 400° C. to at least 2 times its original length.

15. A highly oriented shaped article of a tetrafluoroethylene polymer comprising a shaped article of said polymer having been drawn at a temperature between about 300° C. and about 400° C. to at least 2 times its original length and having a tenacity above about 1.0 gram per denier when measured at room temperature.

16. A process in accordance with claim 1 wherein said shaped article is a filament.

17. An article in accordance with claim 8 which is a filament.

18. A process for the formation of a highly oriented shaped article of a tetrafluoroethylene polymer which comprises drawing the shaped article until it is at least 7 times the original length of the said article.

19. A process in accordance with claim 18 in which said article is a filament.

20. A process in accordance with claim 18 in which said polymer is polytetrafluoroethylene.

21. A highly oriented filament of a polytetrafluoroethylene polymer having a tenacity above about 1.5 grams per denier when measured at room temperature, an orientation angle below about 13°, an initial modulus above about 5 grams per denier when measured at room temperature and a tenacity above about 0.3 gram per denier when measured at 250° C.

22. A filament of a polytetrafluoroethylene polymer having a tenacity in the range of about 1.0 to 2.4 grams per denier when measured at room temperature, an orientation angle below about 13°, and an initial modulus above about 5 grams per denier when measured at room temperature.

References Cited in the file of this patent

UNITED STATES PATENTS

| | | |
|---|---|---|
| 2,244,208 | Miles | June 3, 1941 |
| 2,406,127 | Alfthan | Aug. 20, 1946 |
| 2,559,750 | Berry | July 10, 1951 |
| 2,642,625 | Peck | June 23, 1953 |